United States Patent [19]

Tezuka et al.

[11] Patent Number: 5,679,149
[45] Date of Patent: Oct. 21, 1997

[54] SHORT CARBON FIBER CHOPPED STRANDS AND SHORT CARBON FIBER REINFORCED HYDRAULIC COMPOSITE MATERIALS

[75] Inventors: Mitsuharu Tezuka, Yokohama; Mitsuru Awata, Kodaira; Akira Shiraki, Yokohama, all of Japan

[73] Assignee: Mitsubishi Chemical Corporation, Tokyo, Japan

[21] Appl. No.: 753,033

[22] Filed: Nov. 19, 1996

Related U.S. Application Data

[63] Continuation of Ser. No. 321,627, Oct. 12, 1994, abandoned.

[30] Foreign Application Priority Data

Oct. 13, 1993 [JP] Japan ................... 5-255959

[51] Int. Cl.[6] ........................................... C04B 14/38
[52] U.S. Cl. .................. 106/644; 106/717; 428/367; 428/378; 428/384; 428/387
[58] Field of Search ...................... 501/95; 428/384, 428/387, 389, 367, 372, 378, 703; 106/717, 644

[56] References Cited

U.S. PATENT DOCUMENTS

| | | | |
|---|---|---|---|
| 4,797,378 | 1/1989 | Sowman | 501/95 |
| 4,902,537 | 2/1990 | Yamada et al. | 427/386 |
| 4,961,990 | 10/1990 | Yamada et al. | 501/95 |
| 5,030,282 | 7/1991 | Masuhashi et al. | 106/692 |
| 5,062,897 | 11/1991 | Katsumata et al. | 106/692 |
| 5,227,238 | 7/1993 | Hirai et al. | 428/367 |

FOREIGN PATENT DOCUMENTS

| | | |
|---|---|---|
| 63-162559 | 7/1988 | Japan . |
| 0002876 | 1/1992 | Japan . |
| 0081219 | 3/1994 | Japan . |

*Primary Examiner*—Paul Marcantoni
*Attorney, Agent, or Firm*—Oblon, Spivak, McClelland, Maier & Neustadt, P.C.

[57] ABSTRACT

The present invention provides a short carbon fiber reinforced hydraulic composite material making the best use of physical properties of short carbon fibers incorporated as reinforcing material. Microparticles are deposited on the short carbon fibers in an amount of 0.5 to 3 wt. %. These microparticles also have a particle diameter of 5 microns or less.

6 Claims, No Drawings

SHORT CARBON FIBER CHOPPED STRANDS AND SHORT CARBON FIBER REINFORCED HYDRAULIC COMPOSITE MATERIALS

This application is a continuation of application Ser. No. 08/321,627, filed on Oct. 12, 1994, now abandoned.

TECHNICAL FIELD

The present invention relates to short carbon fiber reinforced hydraulic composite materials exhibiting excellent strength properties suitable for use mainly in the field of civil engineering and construction industry.

PRIOR ART

Carbon fiber reinforced hydraulic composite materials have been developed to improve the poor strength of commonly used materials such as mortar etc. by making use of high tensile strength and modulus exhibited by carbon fibers. These composite materials are excellent in bending strength, tensile strength and toughness.

There has been known a process in which carbon fibers are bound together by means of a water-soluble polymer binder and are individually dispersed during kneading to give a carbon fiber reinforced hydraulic composite material (see Japanese Patent Application Laying Open No. 63-162559).

A problem of the material obtained from the known process referred to above is that when a water-soluble binder was used, the obtained material was poor in bending strength and an intimate bonding of fibers and cement was made impossible, thus failing to impart satisfactory strength to the final composite material.

Another problem is that since cement particles have a large particle diameter often reaching about 100 μm at maximum, cement particles are unable to penetrate between carbon fibers so that it becomes difficult for carbon fibers to be securely bonded to cement.

There have also been reported the results in which the strength of cement was increased by the addition of silica having particle diameter of 0.02 to 0.5 μm. However, when such silica was added to cement in an amount of 10 wt % or more ("%" used herein means wt % unless otherwise noticed) based on the weight of cement, flowability was decreased and operation was made difficult. An increase of water/cement ratio for keeping proper flowability gives rise to another problem of a significant decrease of strength. On the other hand, when silica is added in an amount less than 10%, the presence of silica in the vicinity of carbon fibers becomes less probable, thus difficult to take advantage of a micro filler effect for achieving an improved bonding of carbon fibers and cement.

There is also a process in which a two-pack epoxy emulsion binder having a high content of dispersed silica is employed in order that the silica may be deposited onto carbon fibers (see Japanese Patent Publication No. 4-2715). But, when such binder is used, short carbon fibers in the form of strands are not likely to disperse individually, resulting in the reduction of cement-reinforcing effect.

When silica was deposited in an amount equal to or more than 3%, silica would be excessively present around carbon fibers. That would weaken the bonding of carbon fibers and matrix, so that carbon fibre reinforced cement (CFRC) would be adversely lowered in strength.

SUMMARY OF THE INVENTION

The inventors, as a result of various investigations attempting to solve the above problems, have found that the incorporation of silica to carbon fibers along with a water-soluble binder makes it possible to produce highly strong short carbon fiber reinforced hydraulic composite materials and have accomplished the present invention.

DESCRIPTION OF THE INVENTION

An object of the present invention, therefore, is to provide a reinforcing short carbon fiber chopped strand which becomes intimate with cement and fully exhibits the strength of carbon fibers. Further object of the present invention is to provide a short carbon fiber reinforced hydraulic composite material and a process for the fabrication thereof. These and other objects are easily achieved by providing short carbon fiber chopped strands comprising short carbon fibers bound together by means of a water-soluble binder, wherein microparticles having a particle diameter equal to or less than 5 μm are deposited onto said short carbon fibers in an amount of 0.5 to 3 wt %.

The present invention will be described in detail below.

Cements which can be used in the present invention may be any of, but not limited to, ordinary Portland cement, high-early-strength Portland cement, blast furnace cement, alumina cement and low contraction cement, preferably low contraction cement and high-early-strength Portland cement. Any known carbon fiber may be suitably used in the present invention and includes, but not limited to, carbon fibers from coal tar picth, petroleum pitch, liquefied coal, polyacrylonitrile, cellulose and so forth. Carbon fibers having a fiber diameter of 5 to 20 μm is preferably used, because carbon fibers of such size enables to make the best use of the effect of silica. With respect to fiber length, carbon fibers having an aspect ratio of 500 to 4000 are usually used. Since the optimum diameter of carbon fibers is ranging from 5 to 20 μm, the maximum length thereof becomes 80 mm. Suitably used carbon fibers should have a tensile strength of 100 to 750 Kg/mm$^2$. Carbon fibers are incorporated into short carbon fiber reinforced hydraulic composite materials at a preferable volume fraction of 0.5 to 2%.

Since carbon fibers incorporated in the form of strands into cement along with water should be dispersed individually, water-soluble binders are used for binding the chopped strands of the present invention. Examples of these binders are polyvinyl alcohols including non-saponified polyvinyl acetate, partially-saponified polyvinyl alcohol and totally-saponified polyvinyl alcohol. Cellulose derivatives including methyl cellulose, ethyl cellulose, carboxy ethyl cellulose and hydroxy ethyl cellulose, as well as starch derivatives including soluble starch may also be used. Polyvinyl alcohols are preferable. The concentration of binders is preferably in the range of 0.5 to 2%.

Microparticles to be dispersed in the binder should have a particle diameter equal to or less than 5 μm, preferably of 0.02 to 0.5 μm, and the effective amount of microparticles deposited onto carbon fibers are 0.5 to 3%, preferably 0.6 to 2.5%, more preferably 1 to 1.5%.

A particle diameter of 0.02 to 0.5 μm herein means that at least 70% (by number) of particles have a particle diameter within the range of 0.02 to 0.5 μm. Although any of microparticles such as carbon black and various powdery metals could be used so long as it is water-insoluble, silica is particularly preferred.

For permitting microparticles to deposit onto carbon fibers, microparticles are generally dispersed in the water, sizing agents are added thereto until the specified concentration is reached, and then the obtained solution is impregnated into carbon fibers in the form of long fibers with the aid of a pulley. After the impregnation is finished, carbon fibers are dried at a temperature of 100° C. to 120° C. and thereafter chopped. Preferable fiber length is in the range of 5 to 20 mm.

When microparticles are used in an amount of less than 0.5%, the result remains almost unchanged compared with the absence thereof. When microparticles are used in an amount of more than 3%, microparticles are excessively present around carbon fibers and weaken the bonding of carbon fibers and matrix, thus adversely decreasing the CPRC strength. Under these circumstances, an amount of 0.5% to 3% which is enough to give desired effects has been selected.

Various additives commonly used in CFRC such as aggregates, dispersing agents, dewatering agents and so forth may be added to cement to form hydraulic composite materials.

Aggregates which may be mentioned are sand, silica sand, gravel, crushed stone, hollow silica and fly ash. Fine aggregates having a mean particle diameter of about 0.6 mm, preferably silica sand No. 5, and hollow silica having a mean particle diameter of about 40 µm as lightweight aggregate (hollow silica) are preferably incorporated in total amount of 20 to 30 parts per 100 parts of cement.

Dispersing agents for fibers may be those which are commonly and generally used and may be selected from cellulose derivatives such as methyl cellulose, hydroxyethyl cellulose; cationic surface active agents such as those of polyamide type, polyamine type, alkyl picolinium salt type, and water-soluble acid type alkylamine; anionic surface active agents; nonionic surface active agents such as those of alkylalanine type, and alkylamine oxide type; amphoteric surface active agents such as those of alkylglycine type, alkylalanine type, alkylbetaine type, and alkylimidazoline type. They can be used alone or as a mixture of two or more of them.

Dewatering agents which may be used are special surface active agents based on highly condensated triazine ring salts, special multipolymers containing sulphonic and carboxylic groups, special polymeric activator of anionic type, naphthalene sulphonic acid condensates, lignin sulphonic acid derivatives, etc. They are added in an amount of 1 to 4 parts per 100 parts of cement.

In addition to the dispersing and dewatering agents, other auxiliary agents such as anti-foaming or foaming agents may be suitably incorporated thereinto.

Any of commonly used mixers can be applied to knead raw cement with carbon fibers, water and other auxiliary agents. When mixers having agitator blades of paddle type, propeller type, oar type, turbine type, pan type, ribbon type, screw type, Werner type, or kneader type are used, carbon fibers and raw cement are firstly blended in the absence of water, and then kneaded with water.

EXAMPLES

The invention will be more specifically described by means of the following non-limiting examples.

To prepare a short carbon fiber reinforced hydraulic composite material, 50 parts by weight of water, 25 parts by weight of aggregate and 5 parts by weight of auxiliary agents were blended with 100 parts by weight of cement and the obtained composition was hardened. Carbon fibers were incorporated into the obtained composition at a volume fraction of 1% or 2%. Chopped strands of carbon fibers were 18 mm in length and the major deposition conditions were as follows:

Examples 1 to 8

Silica having a particle diameter of 0.02 to 0.5 µm (Elkem Corp., "Microsilica", grade 980) was added to a binder, 1.5 wt % aqueous polyvinyl alcohol solution (Nihon Gosei Corp., "GOHSENOL" KH-20) and the obtained mixture was stirred until silica was fully dispersed. With the aid of a pulley, the obtained solution was impregnated into carbon fibers having a tensile strength of 238 kg/mm$^2$ and being still in the form of long fibers. Impregnation was controlled in such a way that the amount of silica deposited on the carbon fibers was 0.5%, 0.6%, 0.8%, 1%, 1.5%, 2%, 2.5% or 3%. The obtained carbon fibers were dried at 120° C. for 30 minutes and thereafter were cut into chopped strands of 18 mm in length. These short carbon fiber chopped strands were introduced into a mortar mixer having an inner volume of 5 liters at a volume fraction of 1% or 2% based on the short carbon fiber reinforced hydraulic composite material, along with 100 parts by weight of low contraction cement (Chichibu Cement Corp., "Hai-Akyurasu Cement"), 12.5 parts by weight of silica sand, 12.5 parts by weight of lightweight aggregate and 0.25 parts by weight of methyl cellulose. These materials in the mixer were dry blended for 30 seconds to obtain a mixture in which short fibers were fully dispersed. 50 parts by weight of water was added thereto, then the mixture was kneaded for 30 seconds and thereafter poured into a mold measuring 4×4×16 cm to prepare a molded product of short Carbon fiber reinforced hydraulic composite material. On the following day, the molded product was released from the mold and cured at 20° C. under humidity of 60 R.H %. At the end of curing period of 4 weeks, the molded product was subjected to bending test. In the bending test, loading rate was 2 mm/min and the number of samples was 6. The results are shown in Table 1.

Comparative Examples 1 to 3

Molded products of short carbon fiber reinforced composite material were prepared as in Example 1 except that the amount of silica deposited on carbon fibers was 0%, 0.1% or 5%. The obtained molded products were subjected to bending test. The results are also shown in Table 1.

Comparative Example 4

To a 2-pack epoxy emulsion binder, the same silica as used in Example 1 having a particle diameter of 0.02 to 0.5 µm was added and the obtained mixture was diluted with water to give an emulsion. Carbon fibers which had been impregnated with the above emulsion so that the amount of silica deposited was 2 wt % were cut into short carbon fiber chopped strands of 18 mm in length. Using the obtained short carbon fiber chopped strands and the same formulations as described in Example 1, a molded product of chopped carbon fiber reinforced hydraulic composite material was prepared and subjected to bending test. The results are also shown in Table 1.

TABLE 1

|  | silica content | bending strength (4 weeks)kgf/cm$^2$ | |
| --- | --- | --- | --- |
|  | (wt %) | Vf = 1% | Vf = 2% |
| Example 1 | 0.5 | 115 | 194 |
| Example 2 | 0.6 | 125 | 200 |
| Example 3 | 0.8 | 127 | 210 |
| Example 4 | 0.1 | 126 | 200 |

TABLE 1-continued

|  | silica content (wt %) | bending strength (4 weeks)kgf/cm² | |
| --- | --- | --- | --- |
|  |  | Vf = 1% | Vf = 2% |
| Example 5 | 1.5 | 135 | 205 |
| Example 6 | 2.0 | 130 | 204 |
| Example 7 | 2.5 | 125 | 201 |
| Example 8 | 3.0 | 110 | 190 |
| Comparative Ex. 1 | 0 | 106 | 180 |
| Comparative Ex. 2 | 0.1 | 107 | 182 |
| Comparative Ex. 3 | 5.0 | 102 | 175 |
| Comparative Ex. 4 | 1.0 | 75 | 100 |

Effects of the Invention

As explained above, according to the present invention, since carbon fibers are bound together by means of a slurry comprising of a water-soluble binder in which microparticles having a particle diameter of 0.02 to 0.5 μm are dispersed, it becomes possible to improve the wettability and adhesion of carbon fibers to cement matrix and make the best use of the properties of carbon fibers, thereby allowing to provide highly strong and reliable short carbon fiber reinforced mortar.

What is claimed is:

1. A short carbon fiber reinforced hydraulic composite material incorporating short carbon fiber chopped strands which comprises short carbon fibers having a maximum length of about 80 mm bound together by means of a water-soluble polyvinyl alcohol binder, wherein microparticles having a particle diameter of 0.02 to 0.5 μm are deposited on said short carbon fibers in an amount of 0.5 to 3 wt %.

2. A short carbon fiber reinforced hydraulic composite material comprising a blend of short carbon fiber chopped strands and cement, said short carbon fiber chopped strands being formed by passing carbon fibers through a slurry which comprises microparticles having a particle diameter of 0.02 to 0.5 μm and a water-soluble polyvinyl alcohol binder, and, cutting the bound carbon fibers into short carbon fiber chopped strands having a maximum length of about 80 mm, wherein said microparticles are deposited on said short carbon fiber chopped strands in an amount of 0.5 to 3 wt %.

3. The short carbon fiber reinforced hydraulic composite material according to claims 1 or 2, wherein said microparticles are deposited in an amount of 0.6 to 2.5 wt %.

4. The short carbon fiber reinforced hydraulic composite material according to claims 1 or 2, wherein said microparticles are silica microparticles.

5. The short carbon fiber reinforced hydraulic composite material according to claims 1 or 2, wherein the short carbon fiber has a tensile strength of 100 to 750 kg/mm².

6. The short carbon fiber reinforced hydraulic composite material according to claims 1 or 2, wherein the short carbon fiber has a diameter of 5 to 20 μm.

* * * * *